Figure 4:
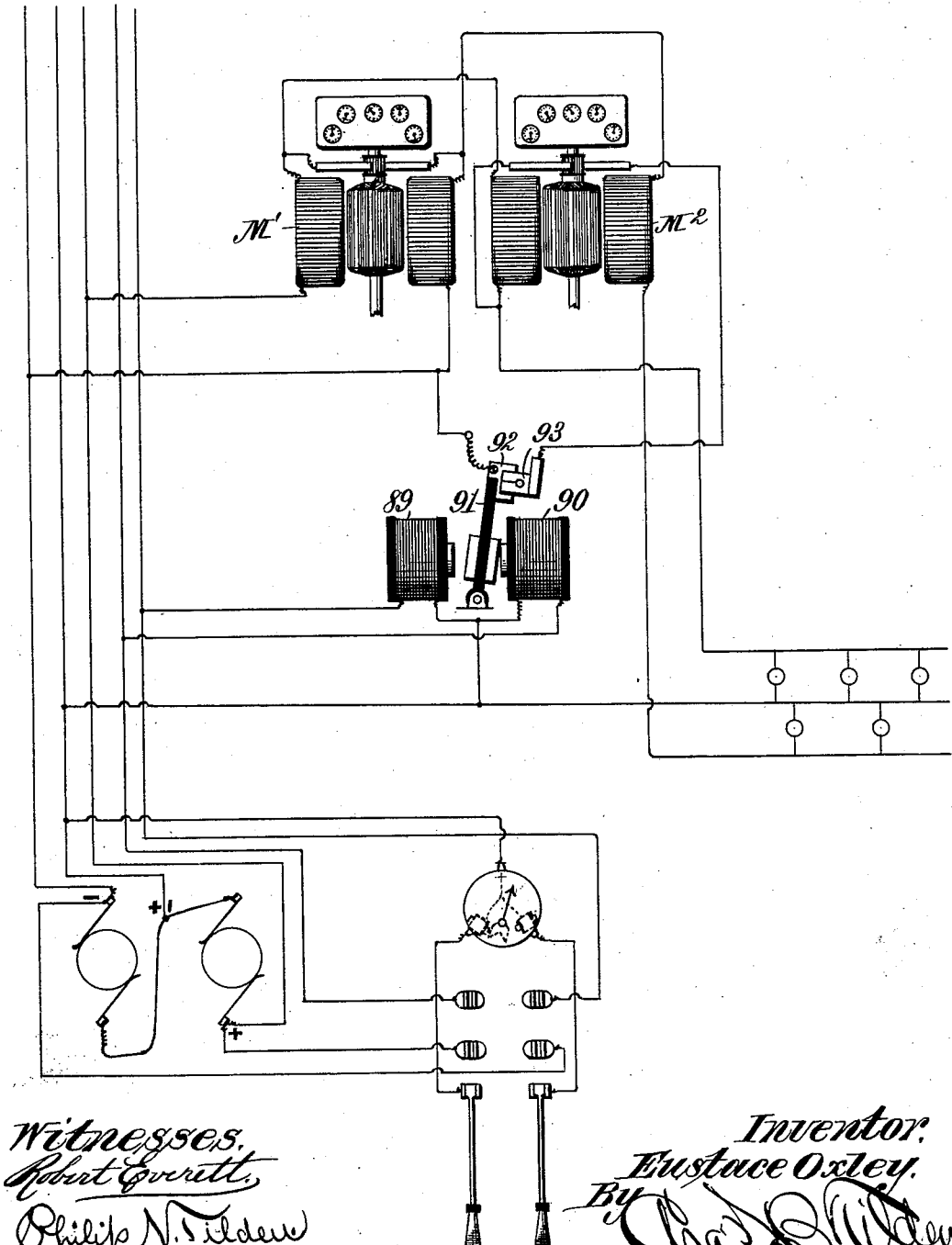

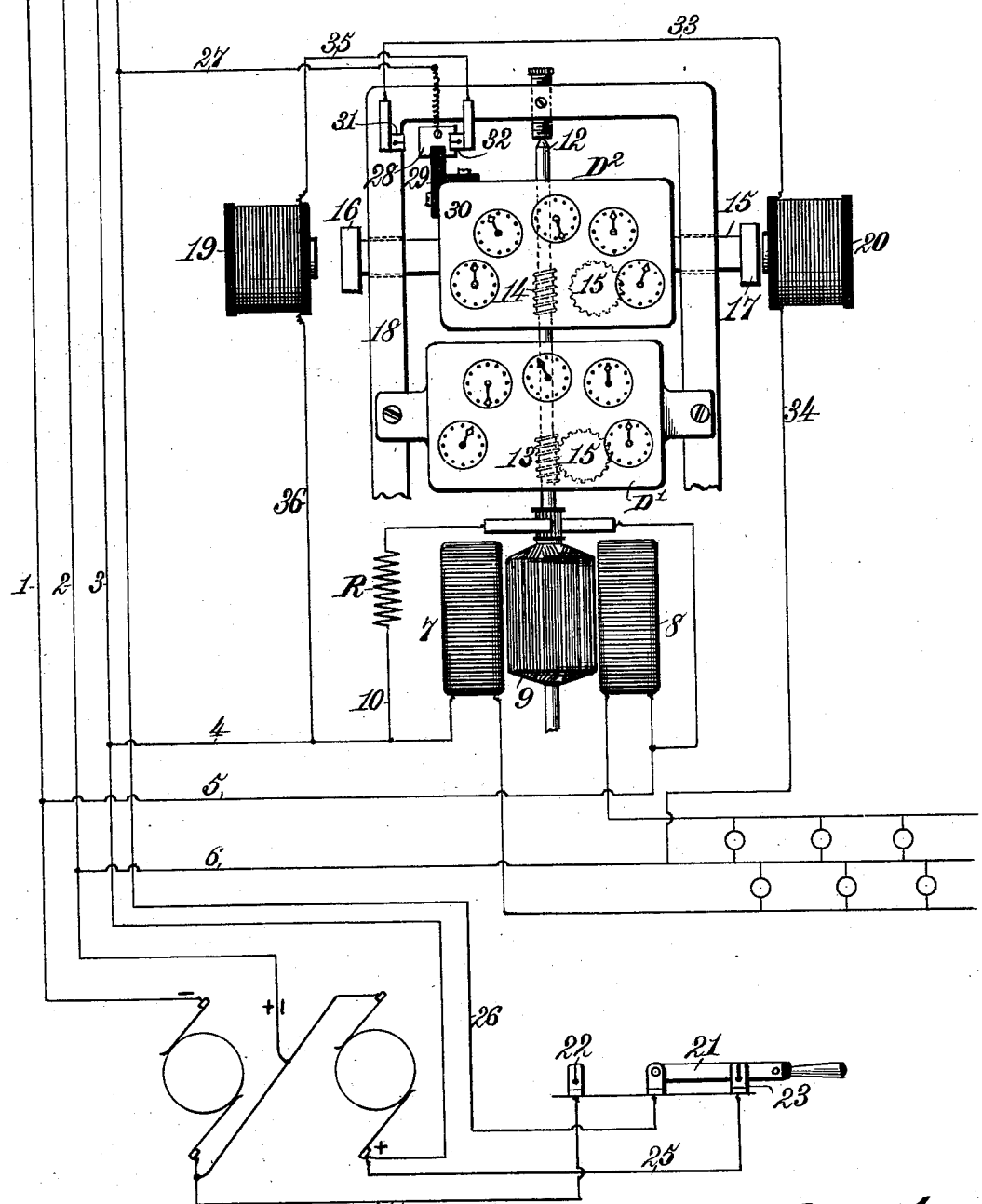

(No Model.)  4 Sheets—Sheet 2.
E. OXLEY.
MULTIPLE METERING OF ELECTRIC CURRENTS.
No. 593,852.  Patented Nov. 16, 1897.
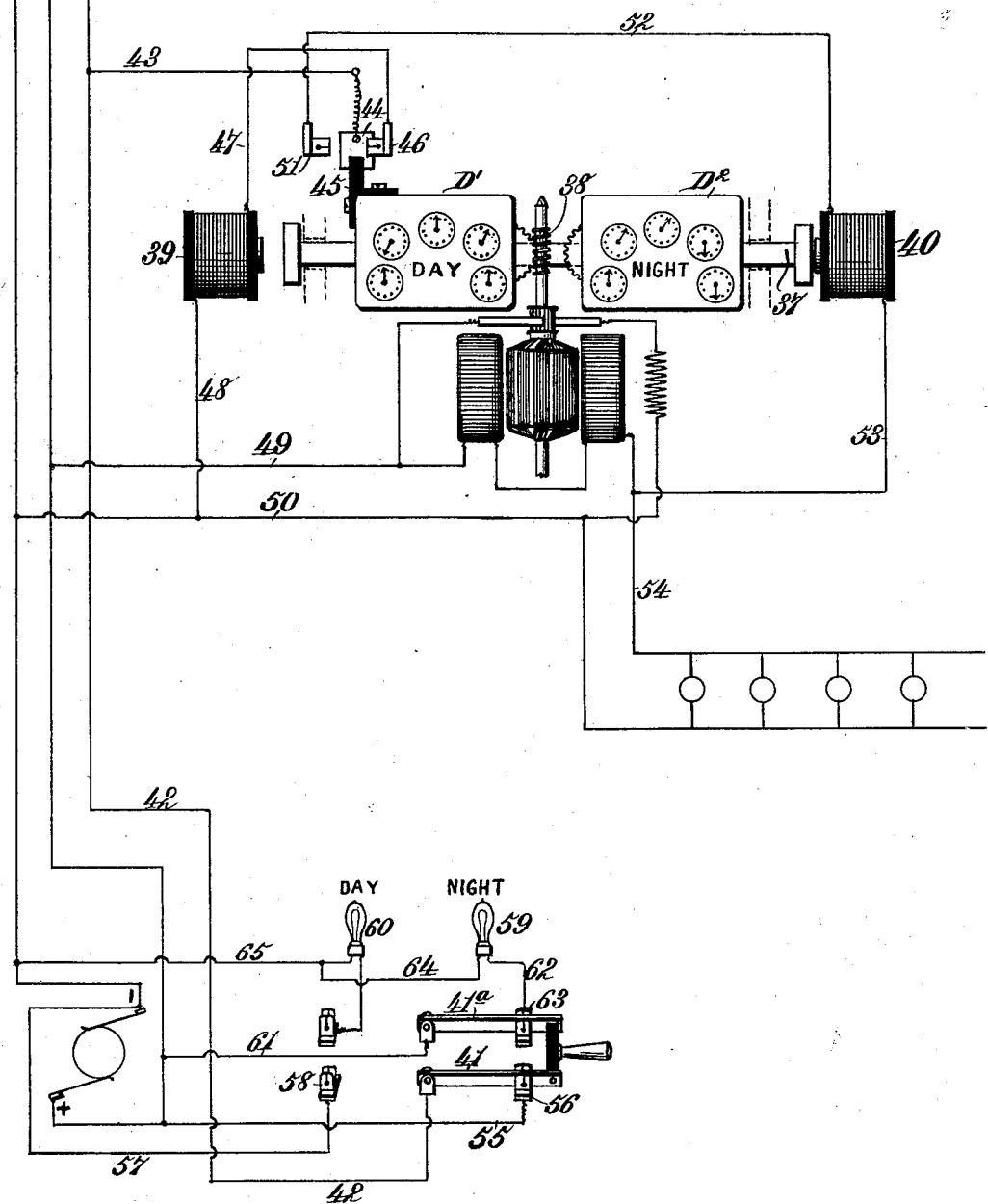
Witnesses,
Robert Everitt,
Philip N. Tilden
Inventor
Eustace Oxley.
By 
Atty.

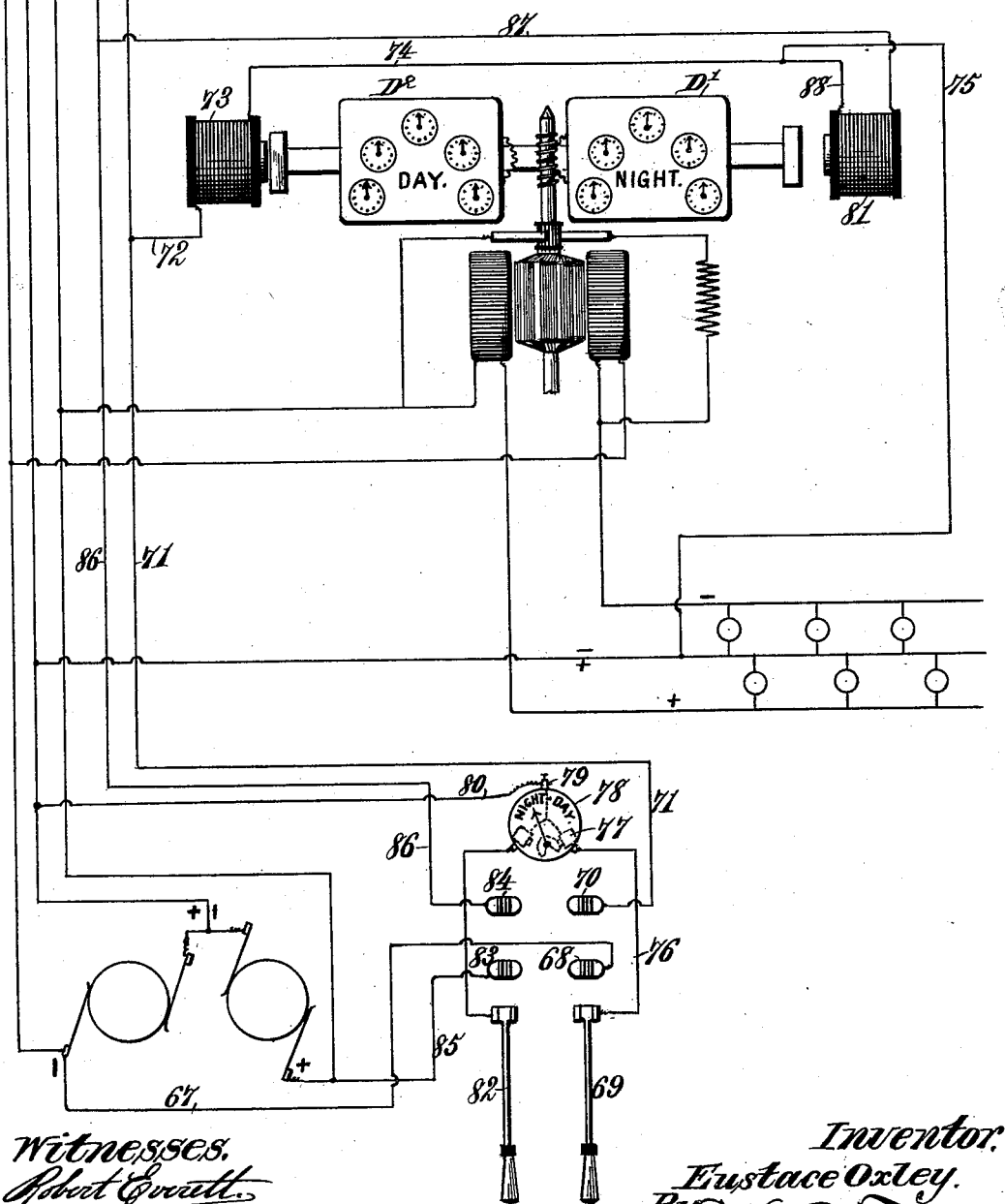

(No Model.) 4 Sheets—Sheet 4.

E. OXLEY.
MULTIPLE METERING OF ELECTRIC CURRENTS.

No. 593,852. Patented Nov. 16, 1897.

Witnesses.
Robert Everitt,
Philip N. Tilden

Inventor.
Eustace Oxley.
By
Atty.

UNITED STATES PATENT OFFICE.

EUSTACE OXLEY, OF WASHINGTON, DISTRICT OF COLUMBIA.

MULTIPLE METERING OF ELECTRIC CURRENTS.

SPECIFICATION forming part of Letters Patent No. 593,852, dated November 16, 1897.

Application filed October 2, 1897. Serial No. 653,908. (No model.)

*To all whom it may concern:*

Be it known that I, EUSTACE OXLEY, a subject of the Queen of Great Britain, residing at Washington, District of Columbia, have invented certain new and useful Improvements in Methods of and Apparatus for Multiple-Rate Metering of Electric Currents, of which the following is a specification.

My present invention relates to methods and apparatus for the multiple-rate metering of electric currents—such, for example, as are shown, described, and claimed in United States Letters Patent granted to me the 17th day of August, 1897, No. 588,170.

It is the purpose of my present invention to provide certain simple and reliable means for controlling the metering or registering mechanisms by which the consumption at different rates is shown, whether such showing is by two separate meters or by two separate sets or series of registering-dials, each set or series being driven in operative alternation with the other set or series of dials by a single moving part, such as is or may be used in connection with any type of meter.

My invention will also comprise the control from a single point, such as a central station, of the metering or registering action of two meters or two sets of dials, one set or one meter being operated continuously to register all the current consumed and the other meter or set of dials being brought into action intermittently or at suitable intervals.

While I make no claim to the use of known metering or registering devices, it is my aim to provide exceedingly simple, economical, and entirely reliable means by which the operation of the meters or registering mechanisms (of whatever type or arrangement these may be) can be accurately controlled from a single point—such, for instance, as a central station.

My invention also comprises the provision of suitable electromagnetic apparatus arranged with reference to the metering or registering mechanism at each point where a multiple rate is given, in combination with simple means at a proper point whereby a control-circuit in which said apparatus is included can be employed to give operative alternation to the metering or registering mechanisms or to supplement the continuous action of one by the periodical action of the other, one being used to register or meter the whole amount of current consumed and the other being brought into operation only during the time when a special charge or higher rate is to be made.

I aim also to provide a simple, cheap, and reliable construction whereby the electromagnetic controlling apparatus by its own operation shall open the control-circuit in which said apparatus is included, thereby rendering it certain that current cannot remain upon the control-circuit longer than the instant required to enable the apparatus to respond to the energy produced by completing the control-circuit.

I propose, finally, to employ at the single point of control simple means for controlling the apparatus and to combine therewith an indicator consisting of illuminating devices, such as lamps of suitable size, each lamp being identified with one of the metering or registering mechanisms, either by a color different from that of the other lamp or by any visible signal or indication of any preferred kind, by which it may be known at any moment and by a glance at which rate current is being furnished.

My invention consists in the novel features and combinations of parts and in the several arrangements and combinations of circuits hereinafter fully described, and then particularly pointed out and defined in the claims.

For the purposes of the following description reference will be had to the accompanying drawings, in which—

Figure 1 is a diagrammatic representation of my invention as applied to two series of registering-dials, one of which series is in continuous action and the other brought into action during certain periods, the apparatus being shown upon a balanced system with a single-wire control-circuit. Fig. 2 is a similar diagram showing two series of dials which have operative alternation, the apparatus being upon a two-wire system and the control-circuit consisting of a single wire only. Fig. 3 is a diagram showing two series of register-ing-dials upon a balanced system, with a two-wire control-circuit. Fig. 4 is a diagram of a practical equivalent of Fig. 1, showing two complete meters in place of two dial series, the action being the same as in Fig. 1, so far as the continuous and periodical operation of the meters is concerned.

My present invention is closely connected with that shown in Letters Patent of the United States granted me August 17, 1897, No. 588,170, and has the same purpose in view as is set forth in two Letters Patent, both granted to me upon the 5th day of October, 1897, and numbered 591,194 and 591,195.

The reference-numerals 1 2 3 in said drawings indicate the negative, neutral, and positive mains of any balanced system of generation and distribution.

The numerals 4 5 6 denote the service-wires tapped off to a single point of consumption, where I may install either two series of dials $D'$ $D^2$ or two independent meters $M'$ $M^2$, as shown in Fig. 4.

I have shown in the drawings a few lamps on the house-wires, but it will be understood that any translating devices may be substituted. The field-coils 7 and 8 and the armature 9, of any type of meter, are shown conventionally, and it should be well understood that in place of the form shown I may employ any meter, whether the same comprises a meter-motor or not—such, for example, as the Edison chemical meter, or the Schallenberger or other types—my invention being entirely applicable to all without requiring any change, save such slight adaptation of the circuit connections as are readily understood by all electricians. In the form of meter illustrated the armature is fed by a shunt 10 from the service-wire 4 with the usual interposed resistance R. The armature-shaft 12 is provided with two worms 13 and 14, one of which is always in mesh with the worm-gear 15, which drives the initial dial of the register $D'$. The second worm 14 is meshed at certain times with the worm-gear of a second dial series $D^2$, which is operated only during those periods when a special rate is charged. The series $D^2$, therefore, may conveniently be upon a movable support, such as an armature-bar $15^a$, having at its ends armatures 16 and 17, the bar $15^a$ being arranged to slide in a frame 18. On opposite sides of the frame are arranged electromagnets 19 and 20, which have circuits as follows: At the central station or at any other convenient single point is placed a double-throw switch 21, having clips 22 and 23. From one side or main, such as the neutral, a wire 24 is taken to the clip 22, and from another side of the system a wire 25 goes to the clip 23. From the pivotal support of the switch 21 a single control-wire 26 runs along the series of points where current is consumed at different rates, and at each point a wire 27 is tapped off to a knife 28, rigidly mounted on an insulating-bracket 29, placed upon the movable support or plate 30, which carries the dials. Upon opposite sides of the knife 28 are clips 31 and 32, into one or the other of which the knife is struck at each movement of the plate 30. For example, when moved to mesh its worm-gear 15 with the worm 14 on the armature-shaft the knife 28 will enter the clip 31, from which a wire 33 is led to the first terminal of the electromagnet 20, the second terminal of the latter being connected by a wire 34 to the neutral house-wire. When the dial series $D^2$ moves to withdraw its gear from the worm 14, the knife 28 enters the clip 32, from which a wire 35 is led to the first terminal of the electromagnet 19, a wire 36 being taken from its second terminal to the service-wire 4. When the switch 21 is in the position shown in the figure, the control-circuit is established by wire 25, clip 23, switch-bar 21, and wire 26 to wire 27 and knife 28, which is in the clip 32, thence by wire 35 to magnet 19 and by wire 36 to the house-wire 4, so that the pull of the magnet 19 upon the armature 16 will draw the dial series $D^2$ into operative position. At the same instant the knife 28 is withdrawn from the clip 32, so that the control-circuit is automatically opened an instant after its completion, the current remaining upon said circuit only long enough to effect the slight movement that is required. The illustration in Fig. 1 is that showing the switch in position to effect the movement described, but the dial series is represented as still in position to complete the control-circuit through the knife 28, clip 32, wire 35, and the helix of electromagnet 19.

In Fig. 2 two similar dial series $D'$ $D^2$ are shown, both mounted on a bar 37 and having the single worm 38 of the armature-shaft between the worm-gears which drive the latter. The bar 37 is moved by electromagnets 39 and 40, having control-circuits as follows: From a switch-bar 41 a wire 42 is led along all the points where multiple rates are given, and at each point a wire 43 is tapped off to a knife 44, carried by a bracket 45 of insulating material, which moves with the two dial series. Movement in one direction strikes the knife into a clip 46, from which a wire 47 is led to the first terminal of the magnet 39, the circuit being completed by a wire 48, which goes to the service-wire 50. By the opposite movement of the dial series and bar 37 the knife 44 enters a clip 51, from which a wire 52 goes to the coil of magnet 40, and from the latter a wire 53 is taken to the positive house-wire 54. Current is supplied to the control-circuit by a wire 55, which is taken from one side of a two-wire system to a clip 56, into which the switch-bar 41 can be thrown. From the other side of the system a wire 57 is led to a clip 58 on the other side of the pivotal support of the switch-bar. In the position shown the control-circuit is by wire 55, clip 56, switch-bar 41, wires 42 and 43 to knife 44, and thence to clip 46, wire 47, coil of magnet 39, and wire 48 to service-wire 50. This, as in Fig. 2, will attract the armature and draw the gear of dial series $D'$ out of mesh and that of $D^2$ into mesh with the worm on the armature-shaft. At the same instant the control-circuit is opened between the knife 44 and clip 46, while the knife by entering the clip 51 completes the circuit at that point for the other electromagnet 40. The latter circuit, however, remains open until the switch is thrown into the clip 58. As the two dial series D' D² have alternate action it is desirable to provide some form of indicator to denote which meter or dial series is in operation. I therefore provide the lamps 59 and 60, which may be colored differently, or, as color may be objectionable in some cases, a word or visible signal of any kind may be so arranged as to be illuminated by each lamp—such, for example, as the word "Day" for one lamp and the word "Night" for the other. The lamps are fed by wire 61 going from one of the mains, such as the positive, to the pivotal support of the second bar 41ᵃ of the switch, thence by a wire 62, which goes from a clip 63 to one of the terminals of the lamp 59, the circuit being completed by wires 64 and 65, the first going from the second terminal of the lamp 60 to the negative side of the system and the second wire 65 going from the second terminal of lamp 59 to the wire 64 and being tapped on the latter. In Fig. 3 I have shown the same form of dials with similar alternation, the chief difference being that the installation is upon a three-wire or balanced system and the control-circuit has two wires and is operated by two separate single-throw switches. The indicator used is substantially the same as in my Letters Patent No. 588,170. When the parts are in the position shown, the control-circuit, which is open until one of the switches is closed, would be from the negative side of the system by a wire 67 to a clip 68, then over switch-bar 69 to a clip 70, thence by one control-wire 71 over wire 72 through the coil of magnet 73 and by wires 74 and 75 to the neutral house-wire. This brings the driving-gear of the night-dial series D' into mesh with the worm on the armature-shaft, and the circuit for the indicator will be by a wire 76 to an electromagnet 77 in the indicator-casing 78, and thence to binding-post 79 and wire 80 to the neutral main. The circuit for the second electromagnet 81, by throwing the switch 82 into clips 83 and 84, will be clearly traced from the preceding description. It includes the wire 85 from the positive side and the second control-wire 86, from which a wire 87 is tapped off to the coil of magnet 81, the circuit being completed by a wire 88 to the wire 75.

The showing in Fig. 4 requires no explanation further than already given, the meter M' being constantly in operation and M² being brought into action at different periods by the electromagnetic apparatus, consisting of magnets 89 90 and armature-bar 91, carrying a knife 92, which strikes into a single clip 93 to complete the armature-circuit of the meter M². This circuit, however, may include any part of the meter in which the current is constant or does not vary with the load.

What I claim as my invention, and desire to secure by Letters Patent, is—

1. In a process of multiple-rate metering of electricity the combination with suitable metering or registering apparatus, of an electromagnetic device suitably located and arranged with relation to each point where a multiple rate is given, a normally open circuit for said electromagnetic device, and means located at a single point for establishing said circuit at suitable intervals, to control the metering or registering apparatus in showing the consumption of current at different rates, substantially as described.

2. In a process of multiple-rate metering, the combination with a plurality of metering or registering mechanisms arranged at a plurality of points where multiple rates are given, of an electromagnetic device suitably located with relation to each of said points, a single circuit for the whole series of said electromagnetic devices, and means located at a single point for establishing said circuit at certain intervals, to control the action of the metering or registering mechanisms, in measuring or registering the current consumption at different rates, substantially as described.

3. In a process of multiple-rate metering of electricity, the combination with a plurality of metering or registering mechanisms of any type arranged at each point where a multiple rate is given, of an electromagnetic device suitably located in relation to each of said points, a single circuit for the series of said electromagnetic devices, and means located at a single point for establishing said circuit momentarily at certain intervals and thereby simultaneously controlling the action of the said metering or registering mechanisms at all the points where the same are placed, substantially as described.

4. In a process of multiple-rate metering, the combination with a series of pairs of meters arranged at a plurality of points, of an electromagnetic apparatus suitably located with relation to each pair of meters, a control-circuit for the said apparatus, and means arranged at a single point for temporarily closing said control-circuit to actuate the electromagnetic apparatus and control the meters in the measurement or registration of current at different rates, substantially as described.

5. In a process of multiple-rate metering, the combination with a series of pairs of meters arranged at points where a multiple rate is given, of an electromagnetic device suitably arranged with relation to each pair of meters, a control-circuit for said electromagnetic device, means placed at a single point for closing said control-circuit at certain hours, and an indicator denoting by illumination which one of each pair of meters is in operation, substantially as described.

6. In a process of multiple-rate metering, the combination with a series of pairs of metering or registering mechanisms arranged at a series of points where current is used at different rates during different periods of the day, of an electromagnetic apparatus suitably arranged in relation to each of said points, of a single control-circuit for the series of electromagnetic apparatus, means located at a single point for closing said circuit at certain times, and an indicator consisting of lamps one of which is lighted when the control-circuit is established to denote which meter is brought into operation, substantially as described.

7. In a process of multiple-rate metering of electric currents, the combination with the mains of a system of a plurality of metering or registering mechanisms of any type arranged at each point where multiple rates are given, a plurality of electromagnets arranged at each of said points, an independent control-circuit for said electromagnets, and means located at a single point for closing said control-circuit, to bring one of said metering or registering mechanisms into operation during a period of inactivity of the second metering or registering mechanisms, substantially as described.

8. In a process of multiple-rate metering, the combination with the mains of a generating system, of two metering or registering mechanisms arranged at each of a number of points where current is consumed at multiple rates, two independent electromagnets suitably arranged with relation to said metering or registering mechanisms, a single control-circuit for all said electromagnets, means arranged at a single point for closing said control-circuit to energize either one of said electromagnets and thereby bring either one of said meters into action, and an indicator consisting of two lamps of different color one of which is lighted when the metering or registering mechanism is brought into action, substantially as described.

9. In a process of multiple-rate metering the combination with two independent metering or registering mechanisms, of an electromagnetic apparatus suitably located with reference to said mechanisms, and consisting of two independent electromagnets, a control-circuit for said electromagnets, means located at a single point for closing said circuit to control the operative relations of the members of each pair of meters, and means whereby the control-circuit is automatically disestablished, or opened, by action due to the energized electromagnet, substantially as described.

In testimony whereof I have hereunto set my hand in presence of two subscribing witnesses.

EUSTACE OXLEY.

Witnesses:
EWELL A. DICK,
E. HUME TALBERT.